(12) United States Patent
Yatake

(10) Patent No.: US 7,307,110 B2
(45) Date of Patent: *Dec. 11, 2007

(54) WATER-BASED PIGMENT INK COMPOSITION

(75) Inventor: Masahiro Yatake, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 354 days.

This patent is subject to a terminal disclaimer.

(21) Appl. No.: 10/468,238

(22) PCT Filed: Feb. 22, 2002

(86) PCT No.: PCT/JP02/01615

§ 371 (c)(1),
(2), (4) Date: Aug. 18, 2003

(87) PCT Pub. No.: WO02/066564

PCT Pub. Date: Aug. 29, 2002

(65) Prior Publication Data

US 2004/0077749 A1   Apr. 22, 2004

(30) Foreign Application Priority Data

Feb. 22, 2001   (JP) ............................. 2001-046164

(51) Int. Cl.
*C09D 11/10* (2006.01)
*C08K 9/10* (2006.01)
*C08K 9/04* (2006.01)

(52) U.S. Cl. ................. 523/160; 523/200; 523/205

(58) Field of Classification Search ............... 523/160, 523/161, 200, 205; 524/495; 106/31.6
See application file for complete search history.

(56) References Cited

U.S. PATENT DOCUMENTS

| | | | | |
|---|---|---|---|---|
| 5,769,930 A | * | 6/1998 | Sano et al. ............... | 106/31.36 |
| 5,922,118 A | * | 7/1999 | Johnson et al. ............ | 106/31.6 |
| 5,981,623 A | * | 11/1999 | McCain et al. ............. | 523/160 |
| 6,379,443 B1 | * | 4/2002 | Komatsu et al. ......... | 106/31.58 |
| 6,387,168 B1 | * | 5/2002 | Koitabashi et al. ........ | 106/31.6 |
| 6,454,403 B1 | * | 9/2002 | Takada et al. .............. | 347/100 |
| 6,511,534 B1 | * | 1/2003 | Mishina et al. .......... | 106/31.33 |
| 6,602,333 B2 | * | 8/2003 | Miyabayashi ............ | 106/31.27 |
| 6,767,090 B2 | * | 7/2004 | Yatake et al. ............... | 347/100 |
| 6,890,378 B2 | * | 5/2005 | Yatake et al. ............. | 106/31.59 |
| 2004/0082686 A1 | * | 4/2004 | Takahashi et al. .......... | 523/160 |

FOREIGN PATENT DOCUMENTS

| | | |
|---|---|---|
| EP | 0834537 | 4/1998 |
| EP | 0947567 | 10/1999 |
| EP | 0978547 | 2/2000 |
| EP | 1041127 A1 * | 10/2000 |
| EP | 1 074 589 | 2/2001 |
| EP | 1114851 A1 * | 7/2001 |
| JP | 8-3498 | 1/1996 |
| JP | 8-283596 | 10/1996 |
| JP | 10-110110 | 4/1998 |
| JP | 2000-239589 | 9/2000 |
| JP | 2000-512670 | 9/2000 |
| WO | WO 2001/94482 A1 * | 12/2001 |

* cited by examiner

*Primary Examiner*—Callie Shosho
(74) *Attorney, Agent, or Firm*—Ladas & Parry LLP

(57) ABSTRACT

Disclosed is a water-based pigment ink composition comprising, as colorants, (1) a surface treated pigment having a water-dispersibility imparting group introduced to the surface thereof and (2) a water-dispersible polymer-encapsulated pigment which is a pigment wholly coated with a polymer. The water-based ink composition exhibits good color developability and satisfactory abrasion resistance, causes little blurring, and has excellent storage stability.

19 Claims, No Drawings

WATER-BASED PIGMENT INK COMPOSITION

TECHNICAL FIELD

This invention relates to a water-based pigment ink composition. The water-based pigment ink composition of the present invention not only provides a recorded image with good color developability, high fixing properties (e.g., abrasion resistance) and little blurring, but also exhibits excellent storage stability.

BACKGROUND ART

It is known to use a pigment having been subjected to a surface treatment for imparting water dispersibility (hereinafter referred to as a water-dispersible surface treated pigment) as a colorant of a water-based pigment ink composition for, for example, inkjet recording. JP-A-8-3498 (The term "JP-A" used herein means an "unexamined published Japanese patent application".) discloses a technique of introducing a carboxylic acid salt to the surface of carbon black particles to improve dispersion stability. JP-W-A-2000-512670 (The term "JP-W-A" used herein means an "international patent application published in its Japanese national stage") discloses an inorganic or organic pigment having an ionic group (or an ionizing group) introduced to its surface, wherein the ionic group includes a carboxyl group, a sulfonic acid group, and their salts.

However, an ink composition containing such a water-dispersible surface treated pigment as a colorant has a disadvantage that color developability can not be improved further than a certain level for the following reason. Because the water-dispersible surface treated pigment has insufficient fixability onto a recording medium, a resin emulsion should be used in combination. The fixability insufficiency problem of the water-dispersible surface treated pigment is particularly noticeable on paper designed for inkjet recording (inkjet paper). In an attempt to improve color developability of an ink composition comprising such a water-dispersible surface treated pigment and a resin emulsion, the pigment content could be increased, which necessitates increasing the resin emulsion content, too. Since the increases in these solid contents result in an increase in viscosity of the ink composition, there is an upper limit in the pigment content. Therefore, the pigment content cannot be increased enough to reach satisfactory color developability.

DISCLOSURE OF THE INVENTION

Accordingly, an object of the present invention is to provide a water-based pigment ink composition which can have a sufficiently increased pigment content without causing an increase of viscosity and therefore satisfies both the requirements of high color developability and high fixability.

The above object is accomplished by a water-based pigment ink composition comprising, as colorants, (1) a surface treated pigment having a water-dispersibility imparting group introduced to the surface thereof, and (2) a water-dispersible polymer-encapsulated pigment which is a pigment wholly coated with a polymer.

BEST MODE FOR CARRYING OUT THE INVENTION

The water-based ink composition of the present invention comprises, as colorants, (1) a surface treated pigment having a water-dispersibility imparting group introduced to the surface thereof (hereinafter sometime simply referred to as a surface treated pigment (1)), and (2) a water-dispersible polymer-encapsulated pigment which is a pigment wholly coated (encapsulated) with a polymer (hereinafter sometime simply referred to as a polymer-encapsulated pigment (2)).

The water-based pigment ink composition comprises one or plural surface treated pigments (1) and one or plural polymer-encapsulated pigments (2). For example, in the case where the water-based pigment ink composition is a black ink composition, it contains one or more pigments for a black ink composition in the form of the surface treated pigment (1) and also in the form of the polymer-encapsulated pigment (2). The pigment(s) that constitutes the surface treated pigment (1) and the polymer-encapsulated pigment (2) may be the same or different from each other, or may comprise a combination of a common pigment and a different pigment.

The water-based pigment ink composition of the invention can be for color printing. Similarly to the black ink composition, in the case where the water-based pigment ink composition of the invention is a color (e.g., yellow, magenta or cyan) ink composition, it contains one or more pigments for the respective color ink composition in the form of the surface treated pigment (1) and also in the form of the polymer-encapsulated pigment (2). The pigment(s) that constitutes the surface treated pigment (1) and the polymer-encapsulated pigment (2) may be the same or different from each other, or may comprise a combination of a common pigment and a different pigment. Examples of the combination of different pigments include a combination of black pigment and a cyan pigment, a combination of a black pigment and a yellow pigment, or a combination of a cyan pigment and a yellow pigment.

The raw material pigments of the surface treated pigments (1) and the polymer-encapsulated pigments (2) may be either inorganic or organic.

Inorganic pigments include carbon blacks and metallic pigments, such as copper oxides, black iron oxide (C.I. Pigment Black 11), and titanium oxide.

Organic pigments include anthraquinone pigments, phthalocyanine pigments, azo pigments, pyranthrone pigments, perylene pigments, perinone pigments, quinacridone pigments, indigoid pigments, thioindigoid pigments, dioxazine pigments, isoindolinone pigments, and quinophthalone pigments.

Pigments for black ink include carbon blacks (C.I. Pigment Black 7), such as furnace black, lamp black, acetylene black and channel black, metallic pigments, such as black copper oxide, black iron oxide (C.I. Pigment Black 11), and titanium oxide, and organic pigments, such as aniline black (C.I. Pigment Black 1). Carbon blacks are preferred for inkjet inks because they hardly settle in water due to their relatively small specific gravity.

Pigments for color ink, expressed by color indices, include C.I. Pigment Yellow 1 (Fast Yellow G), C.I. Pigment Yellow 3, C.I. Pigment Yellow 12 (Disazo Yellow AAA), C.I. Pigment Yellow 13, C.I. Pigment Yellow 14, C.I. Pigment Yellow 17, C.I. Pigment Yellow 24, C.I. Pigment Yellow 34, C.I. Pigment Yellow 35, C.I. Pigment Yellow 37, C.I. Pigment Yellow 42 (yellow iron oxide), C.I. Pigment Yellow 53, C.I. Pigment Yellow 55, C.I. Pigment Yellow 74, C.I. Pigment Yellow 81, C.I. Pigment Yellow 83 (Disazo yellow HR), C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 108, C.I. Pigment Yellow 109, C.I. Pigment Yellow 110, C.I. Pigment Yellow 117, C.I. Pigment Yellow 120, C.I. Pigment Yellow 138, C.I. Pigment Yellow 153;

C.I. Pigment Red 1, C.I. Pigment Red 2, C.I. Pigment Red 3, C.I. Pigment Red 5, C.I. Pigment 17, C.I. Pigment Red 22 (Brilliant Fast Scarlet), C.I. Pigment Red 23, C.I. Pigment Red 31, C.I. Pigment Red 38, C.I. Pigment Red 48:2 (Permanent Red 2B (Ba)), C.I. Pigment Red 48:2 (Permanent Red 2B (Ca)), C.I. Pigment Red 48:3 (Permanent Red 2B (Sr)), C.I. Pigment Red 48:4 (Permanent Red 2B (Mn)), C.I. Pigment Red 49:1, C.I. Pigment Red 52:2, C.I. Pigment Red 53:1, C.I. Pigment Red 57:1 (Brilliant Carmine 6B), C.I. Pigment Red 60:1, C.I. Pigment Red 63:1, C.I. Pigment Red 63:2, C.I. Pigment Red 64:1, C.I. Pigment Red 81 (Rhodamine 6G Lake), C.I. Pigment Red 83, C.I. Pigment Red 88, C.I. Pigment Red 101 (red oxide), C.I. Pigment Red 104, C.I. Pigment Red 105, C.I. Pigment Red 106, C.I. Pigment Red 108 (Cadmium Red), C.I. Pigment Red 112, C.I. Pigment red 114, C.I. Pigment Red 122 (Quinacridone Magenta), C.I. Pigment Red 123, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 185, C.I. Pigment Red 190, C.I. Pigment Red 193, C.I. Pigment Red 209, C.I. Pigment Red 219;

C.I. Pigment Blue 1, C.I. Pigment Blue 2, C.I. Pigment Blue 15 (Phthalocyanine Blue R), C.I. Pigment Blue 15:1, C.I. Pigment Blue 15:2, C.I. Pigment Blue 15:3 (Phthalocyanine Blue G), C.I. Pigment Blue 15:4, C.I. Pigment Blue 15:6 (Phthalocyanine Blue E), C.I. Pigment Blue 16, 17:1, C.I. Pigment Blue 56, C.I. Pigment Blue 60, C.I. Pigment Blue 63; and C.I. Pigment Green 1, C.I. Pigment Green 4, C.I. Pigment Green 7, C.I. Pigment Green 8, C.I. Pigment Green 10, C.I. Pigment Green 17, C.I. Pigment Green 18, and C.I. Pigment Green 36.

The surface-treated pigment (1) which can be used in the invention has a water dispersibility imparting group on the surface of pigment particles. The water dispersibility imparting group includes a carboxylic acid group or a salt thereof, a sulfonic acid group or a salt thereof, and a quaternary ammonium salt group.

The surface treated pigment (1) used in the invention is not particularly limited as long as it is what is obtained by subjecting the above-described raw material pigment to a surface treatment for imparting water dispersibility. For example, it includes carbon black having a carboxylic acid group or a salt thereof introduced to the surface thereof and an inorganic or organic pigment having a carboxylic acid group or a salt thereof or a sulfonic acid group or a salt thereof introduced to the surface thereof.

For example, where a carboxyl group or a hydroxyl group is introduced to the surface of pigment particles as a water dispersibility imparting group, an oxidation treatment can be made use of. The oxidation treatment includes a liquid phase or a vapor phase oxidation treatment with an oxidizing agent, such as ozone, nitric acid, hydrogen peroxide, a hypohalogenous acid, a nitrogen oxide or a fluorine gas, and a plasma treatment. A sulfonation treatment for introducing a sulfonic acid group includes a treatment with a sulfonating agent, such as sulfuric acid, fuming nitric acid, sulfonated pyridinecarboxylic acid, sulfamic acid, sulfur trioxide, chlorosulfuric acid or amidosulfuric acid. These oxidizing agents or sulfonating agents can be used either individually or as a mixture of two or more thereof. Where a pigment is dispersed with the aid of a dispersant, the decomposing agent may be adsorbed to the pigment surface while mechanically mixing the pigment and the dispersant by a shearing force in a dispersing machine, such as a roll mill or a sand mill.

Carbon black having a carboxylic acid group or a salt thereof introduced to its surface can be prepared by, for example, the method taught in JP-A-8-3498. Specifically, carbon black is converted to acidic carbon black, which is further oxidized with a hypohalogenous acid salt in water. The acidic carbon black is carbon black which shows acidity owing to a carboxyl group on the particle surface, which is generally obtained by moderating oxidizing carbon black through surface modification by an oxidation method with a usual oxidizing agent (e.g., nitric acid, ozone, hydrogen peroxide or nitrogen oxide) or a plasma treatment. Acidic carbon black is also available on the market. Such acidic carbon black is further oxidized by treating with a hypohalogenous acid salt (e.g., sodium hypochlorite or potassium hypochlorite, preferably sodium hypochlorite) in water while heating with stirring, thereby to obtain water-dispersible surface treated carbon black.

More specifically, the surface treatment of the acidic carbon black is carried out by putting carbon black and a hypohalogenous acid salt (e.g., sodium hypochlorite) into an adequate amount of water to give a final effective halogen concentration of 10 to 30% by weight based on the weight of the carbon black and stirring the mixture at or above 50° C. (preferably 95 to 105° C.) for 5 hours or longer (preferably about 10 to 15 hours). The resulting carbon black has a surface active hydrogen content of 1.5 mmol/g or more.

The product is collected by filtration, washed with ion-exchanged water to get rid of the by-produced salt, and further purified and concentrated by use of a separation membrane having a pore size of 0.01 μm or smaller (e.g., a reverse osmosis membrane or an ultrafiltration membrane). The concentration is usually effected to give a thick pigment dispersion having a carbon black content of about 10 to 30% by weight based on water. The concentrate is adjusted to a pH of about 9 with an alkali.

An inorganic or organic pigment having a carboxylic acid group or a salt thereof, a sulfonic acid group or a salt thereof or a quaternary ammonium salt group introduced to the surface thereof can be prepared by, for example, the method described in JP-W-A-2000-512670, which comprises reacting a pigment with a diazonium salt having a water dispersibility imparting group to be introduced. An inorganic or organic pigment having a sulfonic acid group or a salt thereof introduced to the surface thereof can be prepared by, for example, the methods described in JP-A-8-283596, JP-A-10-110110, JP-A-10-110111, and JP-A-10-110114, which comprise reacting a pigment with a sulfur-containing treating agent, such as sulfuric acid, fuming sulfuric acid, sulfonated pyridinecarboxylic acid, sulfamic acid, sulfur trioxide, chlorosulfuric acid, or amidosulfuric acid.

Specifically, the treatment with a sulfur-containing treating agent is carried out by dispersing a pigment in a solvent, adding a sulfur-containing treating agent to the dispersion, and heating the dispersion at 60 to 200° C., followed by stirring for 3 to 10 hours. Heating at 60 to 200° C. may precede dispersing. It is preferred that the mixture be slurried beforehand by high shear dispersion in a high-speed mixer, etc. or impact dispersion in a bead mill, a jet mill, etc.

The resulting slurry is then stirred under mild conditions, and the sulfur-containing treating agent is added thereto to introduce the dispersibility imparting group onto the pigment surface. Since introduction of the dispersibility imparting group largely depends on the reaction conditions and the kind of the sulfur-containing treating agent, it is preferable to appropriately employ an appropriate method suitable for the dispersion method. The pigment slurry is then heated, and the solvent and the residual sulfur-containing treating agent are removed from the slurry by washing with water, ultrafiltration, reverse osmosis, repetition of centrifugation and/or filtration, or like means.

The average particle size of the surface treated pigment (1) used in the invention is not particularly limited unless the water dispersibility is affected but is preferably 1 µm or smaller, still preferably 0.05 to 0.2 µm, as measured by a laser light scattering method.

The polymer-encapsulated pigment (2) which can be used in the present invention is prepared in the form of an aqueous emulsion of pigment particles coated with a polymer, namely, polymer-encapsulated pigment particles. The polymer is not particularly limited as long as it is capable of encapsulating the pigment and includes poly(meth)acrylic esters, styrene-(meth)acrylic acid copolymers, polystyrene, polyester, polyamide, polyimide, silicon-containing polymers, and sulfur-containing polymers.

The polymer-encapsulated pigment can be, for example, a pigment encapsulated with a copolymer comprising a dispersant having at least a polymerizable group and a copolymerizable monomer. The dispersant having a polymerizable group includes a compound having at least a hydrophobic group, a hydrophilic group, and a polymerizable group, the polymerizable group including an acryloyl group, a methacryloyl group, an allyl group, and a vinyl group. The copolymerizable monomer includes a radically polymerizable unsaturated compound having an acrylonitrile group, a methacrylonitrile group, an allyl group, a vinyl group, etc. as a copolymerizable group.

It is desirable for pigment particles for inkjet recording ink to have relatively regular particle sizes so as to avoid clogging or to assure ejection stability. From this viewpoint, the polymer-encapsulated pigment is preferably produced by emulsion polymerization. For example, a pigment is dispersed with a dispersant having a polymerizable group (e.g., a polymerizable vinyl group, an allyl group, an acryloyl group or a methacryloyl group), and the dispersant and a copolymerizable monomer are emulsion polymerized in water in the presence of a polymerization initiator.

The polymer-encapsulated pigment used in the water-based ink composition of the present invention can also be produced by other methods, such as acid precipitation, phase inversion of emulsion, and forced emulsification, as well as emulsion polymerization.

The polymer-encapsulated pigment can also be prepared from a reactive surface active agent monomer and a reactive monomer. A number of commercially available reactive surface active agent monomers can be made use of. Examples of useful commercial products are Aqualon HS series (HS-05, HS-10, HS-20 and HS-1025), Aqualon RN series (RN-10, RN-20, RN-30, RN-50, and RN-2025), and New Frontier series (N-177E and S-510), all available from Daiichi Kogyo Yakuhin Co., Ltd.; and Adeka Reasoap SE series (SE-10N, SE1025A, and SE-1025N) and Adeka Reasoap NE series (NE-10, NE-20, NE-30, and NE-40) both available from Asahi Denka Co., Ltd.

The reactive monomer to be reacted with the reactive surface active agent monomer includes acrylonitrile, acrylate compounds, such as butyl methacrylate and butyl acrylate, acrylic acid compounds, and allyl compounds.

Methods for dispersing with the reactive surface active agent include ultrasonication and other methods using a bead mill, a sand mill, a roll mill, etc.

The polymer-encapsulated pigment can also be prepared by phase inversion of emulsion. That is, a pigment and a polymer are added to an organic solvent to dissolve the polymer in the organic solvent, and a neutralizing agent is added to the resulting solution to form an organic solvent phase. An aqueous phase is added to the organic solvent phase while stirring, or the organic solvent phase is added to an aqueous phase while stirring, to obtain a polymer-encapsulated pigment. Compounds which can be used as a polymer component in the phase inversion of emulsion include monomers or oligomers having an acryloyl group, a methacryloyl group, a vinyl group or an allyl group, which has a double bond. Examples of such compounds are styrene, tetrahydrofurfuryl acrylate, butyl methacrylate, an α- (or 2-, 3-, or 4-)alkylstyrene, an α- (or 2-, 3- or 4-)alkoxystyrene, 3,4-dimethylstyrene, α-phenylstyrene, divinylbenzene, vinylnaphthalene, dimethylamino(meth)acrylate, dimethylaminoethyl(meth)acrylate, dimethylaminopropylacrylamide, N,N-dimethylaminoethyl acrylate, acryloylmorpholine, N,N-dimethylacrylamide, N-isopropylacrylamide, N,N-diethylacrylamide, methyl(meth)acrylate, ethyl(meth)acrylate, propyl(meth)acrylate, ethylhexyl(meth)acrylate, other alkyl(meth)acrylates, methoxydiethylene glycol(meth)acrylate, ethoxy(propoxy or butoxy)diethylene glycol (or polyethylene glycol) (meth)acrylate, cyclohexyl(meth)acrylate, benzyl(meth)acrylate, phenoxyethyl(meth)acrylate, isobornyl(meth)acrylate, hydroxyalkyl(meth)acrylates, fluorine- (or chlorine- or silicon-) containing(meth)acrylates,(meth)acrylamide, maleic amide, and (meth)acrylic acid. In addition to these monofunctional compounds, further included for introducing a crosslinked structure are compounds having an acrylic group or a methacrylic group, such as mono- (or di-, tri-, tetra- or poly-)ethylene glycol di(meth)acrylate, a (meth)acrylate of 1,4-butanediol, 1,5-pentanediol, 1,6-hexanediol, 1,8-octanediol or 1,10-decanediol, trimethylolpropane tri(meth)acrylate, glycerol di- (or tri-)(meth)acrylate, a di(meth)acrylate of a bisphenol A or F-ethylene oxide adduct, neopentylglycol di(meth)acrylate, pentaerythritol tetra (meth)acrylate, and dipentaerythritol hexa(meth)acrylate.

It is possible to conduct polymerization while adding at least one polymer selected from the group consisting of a polyacrylic ester, a styrene-acrylic acid copolymer, polystyrene, polyester, polyamide, polyimide, a silicon-containing polymer, and a sulfur-containing polymer thereby to prepare a polymer mainly comprising the polymer added.

Useful polymerization initiators include potassium persulfate and ammonium persulfate. Other initiators commonly used for radical polymerization, such as hydrogen persulfate, azobisisobutyronitrile, benzoyl peroxide, dibutyl peroxide, peracetic acid, cumene hydroperoxide, t-butyl hydroxyperoxide, and p-menthane hydroxyperoxide, are also employable. In a preferred mode of the present invention, a water-soluble polymerization initiator is preferably used.

In carrying out emulsion polymerization in the preparation of the polymer-encapsulated pigment, a chain transfer agent can be used. Suitable chain transfer agents include t-dodecylmercaptan, n-dodecylmercaptan, n-octylmercaptan, xanthogens such as dimethylxanthogen disulfide and diisobutylxanthogen disulfide, dipentene, indene, 1,4-cyclohexadiene, dihydrofuran, and xanthene.

The encapsulated products of fine pigment particles such as those disclosed in JP-B-7-94634 (The term "JP-B" used herein means an "examined Japanese patent publication") and JP-A-8-59715 are also can be used.

Containing the polymer-encapsulated pigment, the water-based ink composition of the present invention can exhibit more favorable properties than a composition containing pigment particles as dispersed with a general dispersant (e.g., a polymeric dispersant (synthetic or natural) or a surface active agent). In an ink composition having a pigment dispersed with a general dispersant (a synthetic or natural polymeric dispersant or a surface active agent), the disperse state is basically maintained by the dispersant merely adsorbed on the pigment surface. The dispersant in such a condition tends to be released from the pigment particles by some environmental factor, which results in an increase of ink viscosity. The amount of the pigment which can be present in this type of ink is limited of necessity. As a result, the ink sometimes fails to secure sufficient color developability of a recorded image. In contrast, the water-based ink composition of the invention, which contains the polymer-encapsulated pigment, does not need the above-described dispersant and hardly induces separation of the resin encapsulating the pigment. Since an increase in pigment content is not accompanied with an increase in ink viscosity, the ink composition can contain an increased amount of the pigment and yet has a low viscosity. Compared with an ink having a pigment dispersed with the dispersant, the ink composition of the invention is allowed to have an increased pigment content thereby to secure sufficient color developability.

The contents of the surface treated pigment (1) and the polymer-encapsulated pigment (2) in the water-based ink composition of the invention are not particularly limited. A preferred surface treated pigment (1) content is 0.1 to 10% by weight, particularly 1 to 8% by weight, based on the total water-based ink composition. A surface treated pigment (1) content less than 0.1% by weight can result in a failure to obtain sufficient color developability. A surface treated pigment (1) content more than 10% by weight can result in a failure to exhibit sufficient fixing properties.

A preferred polymer-encapsulated pigment (2) content is 0.1 to 10% by weight, particularly 1 to 8% by weight, based on the total water-based ink composition. A polymer-encapsulated pigment (2) content less than 0.1% by weight can result in a failure to obtain sufficient fixing effects. A polymer-encapsulated pigment (2) content more than 10% by weight can result in an increased viscosity that makes the ink inconvenient to use.

The total amount of the pigment in the surface treated pigment (1) and the pigment in the polymer-encapsulated pigment (2) preferably ranges, but is not limited to, 0.1 to 20% by weight, particularly 1 to 15% by weight, based on the weight of the total ink composition. With the total pigment content being less than 0.1% by weight, the ink can fail to secure sufficient color developability. The total pigment content exceeding 20% by weight tends to result in an increased ink viscosity, which can cause clogging.

The polymer content in the polymer-encapsulated pigment (2) used in the water-based ink composition of the invention is preferably, but not limited to, 10% by weight or more, still preferably 20% by weight or more, based on the weight of the pigment in the polymer-encapsulated pigment (2). Where the polymer content is less than 10% by weight, the ink composition can fail to assure sufficient fixability.

It is desirable for the water-based ink composition of the invention to have high penetrability. From this viewpoint and also for improving storage stability and for effectively preventing blurring of a recorded image and improving color developability to obtain satisfactory print quality, the water-based ink composition of the invention can contain (a) an acetylene glycol surface active agent and/or an acetylene alcohol surface active agent and (b) at least one compound (penetrant) selected from the group consisting of diethylene glycol monobutyl ether, triethylene glycol monobutyl ether, propylene glycol monobutyl ether, dipropylene glycol monobutyl ether, a 1,2-alkylene glycol, and a compound represented by general formula (1):

$$R\text{-}(EO)_n\text{---}(PO)_m\text{-}M \tag{1}$$

wherein R represents a straight-chain or branched alkanol group having 4 to 12 carbon atoms, a cycloalkanol group having 4 to 12 carbon atoms, a phenol group or a naphthol group; EO stands for an ethyleneoxy group; PO stands for a propyleneoxy group; n and m each independently represent 0 to 10 provided that they do not simultaneously represent 0, n and m each indicate an average number of the repeating units EO and PO, respectively, present in the whole molecule; the partial formula $-(EO)_n\text{---}(PO)_m-$ does not mean to limit the positions or the orders of EO and PO in the molecule but means to represent that EO and PO are present in the molecule at arbitrary positions in arbitrary orders; M represents a hydrogen atom, a sulfonic acid salt group, a phosphoric acid salt group or a boric acid salt group; and, where M is a sulfonic acid salt group, a phosphoric acid salt group or a boric acid salt group, it may have, as a counter ion, a hydrogen ion, an alkali metal ion, an inorganic base ion (e.g., an ammonium ion or a quaternary ammonium ion) or an organic amine ion.

The total content of (a) the acetylene glycol surface active agent and/or the acetylene alcohol surface active agent and (b) the penetrant is preferably, but not limited to, 0.5 to 30% by weight, still preferably 1 to 15% by weight, based on the weight of the total water-based pigment ink composition. It is particularly preferred for the ink composition to contain not more than 5% by weight of the acetylene glycol surface active agent and/or the acetylene alcohol surface active agent.

It is preferred for the ink composition of the invention to contain both of (a) the acetylene glycol surface active agent and/or the acetylene alcohol surface active agent and (b) the penetrant.

The 1,2-alkylene glycol as a penetrant (b) is preferably a 1,2-alkylene glycol having 4 to 10 carbon atoms, such as 1,2-pentanediol or 1,2-hexanediol. In using the 1,2-alkylene glycol having 4 to 10 carbon atoms, such as 1,2-pentanediol and/or 1,2-hexanediol, its content is preferably not more than 10% by weight, still preferably not more than 7% by weight.

In using propylene glycol monobutyl ether or dipropylene glycol monobutyl ether, its content is preferably not more than 10% by weight, still preferably not more than 7% by weight. In using diethylene glycol monobutyl ether or triethylene glycol monobutyl ether, its content is preferably not more than 20% by weight, still preferably not more than 15% by weight.

In formula (1) representing the polyethylene oxide-polypropylene oxide derivative, while M is not particularly limited, it is preferably a hydrogen atom, a sulfonic acid salt group, a phosphoric acid salt group or a boric acid salt group. Where M is a sulfonic acid salt group, a phosphoric acid salt group and/or a boric acid salt group, M may have, as a counter ion, a hydrogen ion, an alkali metal ion, an inorganic base ion and/or an organic amine ion. In formula (1) representing the polyethylene oxide-polypropylene oxide derivative, it is preferred that n be 0 to 10 and m be 1 to 5, and it is still preferred that n be 1 to 8 and m be 1 to 12.

The water-based pigment ink composition of the invention preferably has a surface tension of 25 to 40 mN/m, particularly 28 to 35 mN/m.

In order to assure storage stability and stability in ejection from an ink ejection head, the water-based pigment ink composition of the invention can contain various additives, such as humectants, dissolution aids, penetration suppressors, viscosity modifiers, pH adjustors, dissolution aids, antioxidants, antifungals, anticorrosive agents, and/or metal ion scavengers. Typical examples of these additives will be described below.

It is preferred to add water-soluble glycols to suppress ink drying on the front surface of a nozzle. Examples thereof are ethylene glycol, diethylene glycol, triethylene glycol, propylene glycol, dipropylene glycol, tripropylene glycol, polyethylene glycol having a molecular weight of 2000 or less, 1,3-propylene glycol, isopropylene glycol, isobutylene glycol, 1,4-butanediol, 1,3-butanediol, 1,5-pentanediol, 1,6-hexanediol, glycerol, meso-erythritol, and pentaerythritol.

In order to prevent the ink from drying on the front surface of a nozzle, various sugars can be used. The sugars include monosaccharides and polysaccharides. Specific examples thereof are glucose, mannose, fructose, ribose, xylose, arabinose, lactose, galactose, aldonic acids, glucitol, maltose, cellobiose, sucrose, trehalose, and maltotriose. Alginic acid and salts thereof, cyclodextrins, and celluloses are also usable. The amount of the sugars to be added, which is not particularly limited, is preferably 0.05 to 30% by weight. A sugar content of less than 0.05% by weight produces little effect in eliminating nozzle clogging caused by ink drying at the head tip. A sugar content exceeding 30% by weight results in an increased ink viscosity leading to a failure to perform proper printing. A still preferred content of monosaccharides and polysaccharides, which are common sugars, such as glucose, mannose, fructose, ribose, xylose, arabinose, lactose, galactose, aldonic acids, glucitol, maltose, cellobiose, sucrose, trehalose, maltotriose, etc., is 3 to 20% by weight. The amount of alginic acid or salts thereof, cyclodextrins, and celluloses to be added should be selected so as not to result in too high an ink viscosity.

In addition, compounds having water compatibility thereby to increase solubility of glycol ethers or other ink components which have low water solubility, to improve penetrability into a recording medium such as paper, or to prevent nozzle clogging include alkyl alcohols having 1 to 4 carbon atoms, such as ethanol, methanol, butanol, propanol, and isopropyl alcohol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol monoisopropyl ether, diethylene glycol monoisopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol monoisopropyl ether, dipropylene glycol monomethyl ether, dipropylene glycol monoethyl ether, dipropylene glycol mono-n-propyl ether, dipropylene glycol monoisopropyl ether, propylene glycol mono-n-butyl ether, and dipropylene glycol mono-n-butyl ether; formamide, acetamide, dimethyl sulfoxide, sorbitol, sorbitan, acetin, diacetin, triacetin, and sulfolane, from which an appropriate choice can be made.

The water-based pigment ink composition of the invention can contain other surface active agents for penetrability control. Surface active agents to be added are preferably chosen from those compatible with the water-based pigment ink composition of the invention, particularly those highly penetrable and stable. Such surface active agents include amphoteric ones and nonionic ones. Examples of the amphoteric ones are lauryldimethylamino-acetic acid betaine, 2-alkyl-N-carboxymethyl-N-hydroxyethylimidazolinium betaines, coconut oil fatty acid amidopropyldimethylamino-acetic acid betaine, polyoctylpolyaminoethylglycine, and imidazoline derivatives. Examples of the nonionic ones include ethers, such as polyoxyethylene nonylphenyl ether, polyoxyethylene octyiphenyl ether, polyoxyethylene dodecylphenyl ether, polyoxyethylene alkylallyl ethers, polyoxyethylene oleyl ether, polyoxyethylene lauryl ether, polyoxyethylene alkyl ethers, and polyoxyalkylene alkyl ethers; polyoxyethylene oleic acid; esters, such as polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; and fluorine-containing surface active agents, such as fluoroalkyl esters and perfluoroalkylcarboxylic acid salts.

The pH adjustors, dissolution aids, and antioxidants which can be used include amines and amine derivative, such as diethanolamine, triethanolamine, propanolamine, and morpholine; inorganic salts, such as potassium hydroxide, sodium hydroxide, and lithium hydroxide; ammonium hydroxide, quaternary ammonium hydroxides (e.g., tetramethylammonium); carbonates, such as potassium carbonate, sodium carbonate, and lithium carbonate; phosphates; N-methyl-2-pyrrolidone; ureas, such as urea, thiourea, and tetramethylurea; allophanates, such as allophanates and methyl allophanate; biuret and its derivatives, such as dimethyl biuret and tetramethyl biuret; and L-ascorbic acid and its salts. Commercially available antioxidants or ultraviolet absorbers are usable, which include Tinuvin 328, 900, 1130, 384, 292, 123, 144, 622, 770 or 292, Irgacor 252 or 153, and Irganox 1010, 1076 or 1035, and MD 1024 (all available from Ciba-Geigy, Ltd.); and lanthanide oxides.

The viscosity modifiers include rosins, alginic acids, polyvinyl alcohol, hydroxypropyl cellulose, carboxymethyl cellulose, hydroxyethyl cellulose, methyl cellulose, polyacrylic acid salts, polyvinylpyrrolidone, and gum-arabic starch.

The water-based ink composition of the invention is the same as known general water-based pigment ink compositions except for containing the surface treated pigment (1) and the polymer-encapsulated pigment (2) as colorants.

The water-based ink composition of the invention can be used on arbitrary recording media, such as plain paper, regenerated paper, and coated papers. Even when applied to exclusively designed papers with an ink absorbing layer, it exhibits sufficient fixing properties and color developability.

While the water-based ink composition of the invention can be used in arbitrary recording methods, it is suited for use in inkjet recording.

EXAMPLES

The present invention will now be illustrated in greater detail with reference to Examples, but it should be understood that the invention is not construed as being limited thereto.

Pigments 1 to 4 used in Examples and Comparative Examples are described below. Surface treated pigments and polymer-encapsulated pigments were prepared using pigments 1 to 4 as a raw material pigment.

Pigment 1
  Carbon black pigment (C.I. Pigment Black 7; Raven C from Columbian Carbon)
Pigment 2
  C.I. Pigment Blue 15:3 (copper phthalocyanine pigment from Clariant)
Pigment 3
  C.I. Pigment Red 122 (dimethylquinacridone pigment from Clariant)
Pigment 4
  C.I. Pigment Yellow 180 (diketopyrrolo-pyrrole from Clariant)

(1) Preparation of Surface Treated Pigments

Surface treated pigment 1 was prepared as follows. In water were put 20 parts by weight of pigment 1 (Raven C) and sodium hypochlorite in an amount giving an effective halogen concentration of 20 wt % with respect to the weight of the carbon black, and the mixture was stirred at 98° C. for about 15 hours, followed by cooling to room temperature. The surface active hydrogen content of the mixture was 1.5 mmol/g or more as calculated from the amount of the pigment and the pH.

The product was collected by filtration, washed with ion-exchanged water to remove the by-produced salt, and purified and concentrated by means of a reverse osmosis membrane having a pore size of 5 μm to obtain a thick pigment dispersion having a carbon black content of 20 wt % based on water. The dispersion was adjusted to a pH of about 9 with sodium hydroxide.

Surface treated pigment 2 was prepared as follows. In 80 parts by weight of quinoline was put 20 parts by weight of pigment 2 and dispersed by high-speed shearing in a high-speed mixer to prepare a slurry. The slurry was then agitated mildly, and 10 parts by weight of sulfamic acid was added to 50 parts by weight of the slurry. The mixture was heated to 150° C. and stirred for 8 hours to introduce a sulfonic acid group, which is a dispersing group, to the pigment surface. The pigment slurry was heat treated and washed with water to get rid of the solvent and the residual sulfamic acid to obtain surface treated pigment 2.

Surface treated pigments 3 and 4 were prepared in the same manner as for surface treated pigment 2.

The resulting surface treated pigments 1 to 4 were used in Examples and Comparative Examples described hereunder.

(2) Preparation of Polymer-Encapsulated Pigments

Polymer-encapsulated pigment 1 was prepared in the same manner as described in Example 1 of JP-A-10-316909. Specifically, 30 parts by weight of pigment 1 (Raven C), 3 parts by weight of 1-nonylphenyl-2-polyethylene glycol-3-acryloylated glycerin (a polymerizable surface active agent Adeka Reasoap SE-10N from Asahi Denka Co., Ltd.), and 80 parts by weight of ion-exchanged water were put into a reaction vessel equipped with an ultrasonic generator, a stirrer, a dropping device, a water cooling type reflux condenser, and a temperature controller, and the mixture was dispersed by ultrasonication for 4 hours. To the dispersion were added 3 parts by weight of acrylonitrile and 0.05 part by weight of potassium persulfate, and the system was heated at 60° C. for 48 hours to conduct polymerization. The resulting solution was filtered through a 0.5 μm membrane filter to remove coarse particles.

Into the reaction vessel were put 27 parts by weight of ion-exchanged water and 0.05 part by weight of sodium laurylsulfate. To the mixture were further added 100 parts by weight of ion-exchanged water and 0.5 part by weight of potassium persulfate as a polymerization initiator, and the system was maintained at 70° C. in a nitrogen atmosphere. Three parts by weight of the polymerizable surface active agent Adeka Reasoap SE-10N was added thereto. After-stirring, a mixture consisting of 15 parts by weight of styrene, 6 parts by weight of tetrahydrofurfuryl methacrylate, 45 parts by weight of butyl acrylate, and 0.02 part by weight of t-dodecylmercaptan was added thereto dropwise to carry out reaction. The reaction mixture was neutralized to pH 8 with sodium hydroxide and filtered through a 0.3 μm filter to obtain polymer-encapsulated pigment 1, which had a polymer amount of 40 wt % based on pigment 1.

Polymer-encapsulated pigments 2 to 4 were prepared in the same manner as described above.

The polymer-encapsulated pigments 1 to 4 were used in Examples and Comparative Examples.

Example 1

An ink composition was prepared from the components listed below. Concretely, the polymer-encapsulated pigment and the surface treated pigment were mixed to prepare a pigment mixture. Separately, the other components (additives) other than water were mixed up, and water was added thereto to prepare a mixture, which was added to the pigment mixture while stirring.

In Example 1 and other Examples and Comparative Examples given infra, the amounts of the polymer-encapsulated pigments added were given by weight on solid basis, and water as a component was one consisting of ion-exchanged water, 0.1 to 1 wt % of Proxel XL-2 as a preservative, 0.001 to 0.05 wt % of benzotriazole as a rust inhibitor for protecting inkjet head members, and 0.01 to 0.03 wt % of EDTA for reducing the influences of metal ions present in ink.

Ink formulation (unit: wt %):

| | |
|---|---|
| Polymer-encapsulated pigment 1 (pigment:polymer = 6:4 by weight; average particle size: 105 nm) | 5.0 |
| Surface treated pigment 1 | 4.0 |
| DEGmBE* | 5.0 |
| Olfin E1010** | 1.0 |
| Glycerin | 9.0 |
| 1,5-Pentanediol | 5.0 |
| Triethanolamine | 0.8 |
| Water | balance |

*DEGmBE: diethylene glycol monobutyl ether
**Olfin E1010: acetylene glycol surface active agent available from Nisshin Chemical Industry Co., Ltd.

Example 2

An ink composition was prepared from the components shown below in the same manner as in Example 1.

Ink formulation (unit: wt %):

| | |
|---|---|
| Polymer-encapsulated pigment 2 (pigment:polymer = 6:4 by weight; average particle size: 85 nm) | 2.5 |
| Surface treated pigment 2 | 2.5 |
| TEGmBE* | 10.0 |
| Dipropylene glycol | 5.0 |
| Surfynol 465** | 1.2 |
| Triethanolamine | 0.9 |
| Water | balance |

*TEGmBE: triethylene glycol monobutyl ether
**Surfynol 465: acetylene glycol surface active agent available from Air Products and Chemicals, Inc., U.S.A.

Example 3

An ink composition was prepared from the components shown below in the same manner as in Example 1.

Ink formulation (unit: wt %):

| | |
|---|---|
| Polymer-encapsulated pigment 3 (pigment:polymer = 6:4 by weight; average particle size: 90 nm) | 2.5 |
| Surface treated pigment 3 | 3.0 |
| 1,2-Hexanediol | 10.0 |
| Olfin STG* | 0.5 |
| Diethylene glycol | 7.0 |
| Thiodiglycol | 3.5 |
| 1,6-Hexanediol | 5.0 |
| Triethanolamine | 1.0 |
| Potassium hydroxide | 0.1 |
| Water | balance |

*Olfin STG: acetylene glycol surface active agent available from Nisshin Chemical Industry Co., Ltd.

Example 4

An ink composition was prepared from the components shown below in the same manner as in Example 1.

Ink formulation (unit: wt %):

| | |
|---|---|
| Polymer-encapsulated pigment 4 (pigment:polymer = 6:4 by weight; average particle size: 80 nm) | 4.0 |
| Surface treated pigment 4 | 3.5 |
| TEGmBE | 3.0 |
| 1,2-Pentanediol | 5.0 |
| Surfynol 61* | 0.5 |
| Tetraethylene glycol | 9.0 |
| 1,5-Pentanediol | 2.0 |
| Dimethyl-2-imidazolidinone | 2.0 |
| Sodium benzoate | 0.1 |
| Triethanolamine | 0.7 |
| Water | balance |

*Surfynol 61: acetylene alcohol surface active agent available from Air Products and Chemicals, Inc., U.S.A.

Example 5

An ink composition was prepared from the components shown below in the same manner as in Example 1.

Ink formulation (unit: wt %):

| | |
|---|---|
| Polymer-encapsulated pigment 1 (pigment:polymer = 5:5 by weight) | 4.0 |
| Surface treated pigment 1 | 3.5 |
| DPGmBE* | 2.0 |
| DEGmBE** | 7.0 |
| Glycerin | 14.0 |
| Triethanolamine | 0.9 |
| Water | balance |

*DPGmBE: dipropylene glycol monobutyl ether
**DEGmBE: diethylene glycol monobutyl ether

Example 6

An ink composition was prepared from the components shown below in the same manner as in Example 1.

Ink formulation (unit: wt %):

| | |
|---|---|
| Polymer-encapsulated pigment 2 (pigment:polymer = 5:5 by weight) | 3.0 |
| Surface treated pigment 1 | 2.0 |
| Olfin E1010 | 1.0 |
| Compound of formula (1)* | 5.0 |
| TEGmBE | 1.0 |
| Glycerin | 15.0 |
| Thiodiglycol | 2.0 |
| 1,5-Pentanediol | 1.0 |
| Triethanolamine | 0.9 |
| Water | balance |

*Compound of formula (1): a polyethylene oxide-polypropylene oxide derivative of formula (1)

wherein R is a 4-methyl-1-pentanol group; n is 1.0; m is 5.5; and M is a hydrogen atom.

Example 7

An ink composition was prepared from the components shown below in the same manner as in Example 1.

Ink formulation (unit: wt %):

| | |
|---|---|
| Polymer-encapsulated pigment 3 (pigment:polymer = 5:5 by weight) | 3.0 |
| Surface treated pigment 3 | 3.5 |
| Surfynol 61 | 0.5 |
| Compound of formula (1)* | 10.0 |
| Glycerin | 15.0 |
| Trimethylolpropane | 1.0 |
| Trimethylolethane | 1.0 |
| Surfynol 465 | 1.0 |
| Triethanolamine | 0.5 |
| KOH | 0.05 |
| Water | balance |

*Compound of formula (1): a polyethylene oxide-polypropylene oxide derivative of formula (1) wherein R is a 2-methyl-1-butanol group; n is 1.0; m is 6.0; and M is a hydrogen atom.

Example 8

An ink composition was prepared from the components shown below in the same manner as in Example 1.

Ink formulation (unit: wt %):

| | |
|---|---|
| Polymer-encapsulated pigment 4 (pigment:polymer = 5:5 by weight) | 4.5 |
| Surface treated pigment 4 | 3.5 |
| Olfin STG | 1.0 |
| PGmBE* | 2.0 |
| DEGmBE | 10.0 |
| Glycerin | 7.0 |
| Diethylene glycol | 5.0 |
| Tetrapropylene glycol | 5.0 |
| Triethanolamine | 0.9 |
| KOH | 0.1 |
| Water | balance |

*PGmBE: propylene glycol monobutyl ether

Comparative Example 1

An ink composition was prepared from the components shown below in the same manner as in Example 1.

Ink formulation (unit: wt %):

| | |
|---|---|
| Polymer-encapsulated pigment 1 (average particle size of pigment: 105 nm) | 5.0 |
| Glycerin | 10.0 |
| Dispersant | 3.0 |
| Nonionic surface active agent | 1.0 |
| Ion-exchanged water | balance |

The nonionic surface active agent used in Comparative Example 1 was Noigen EA160 from Daiichi Kogyo Seiyaku Co., Ltd. The dispersant used was a general acrylic dispersant Joncryl 679 from Johnson Polymer.

Comparative Example 2

An ink composition was prepared from the components shown below in the same manner as in Example 1.

Ink formulation (unit: wt %):

| | |
|---|---|
| Acid Blue 9 | 5.5 |
| DEGmME* | 7.0 |
| Diethylene glycol | 10.0 |
| 2-Pyrrolidine | 5.0 |
| Ion-exchanged water | balance |

*DEGmME: diethylene glycol monomethyl ether

Comparative Example 3

An ink composition was prepared from the components shown below in the same manner as in Example 1.

Ink formulation (unit: wt %):

| | |
|---|---|
| Direct Black 154 | 2.5 |
| Diethylene glycol | 10.0 |
| Nonionic surface active agent | 1.0 |
| Ion-exchanged water | balance |

The nonionic surface active agent used in Comparative Example 3 was Epan 450 available from Daiichi Seiyaku Co., Ltd.

Evaluation of Physical Properties (1) Dependence of Storage Stability on Polymer Content The influence of polymer content on storage stability of an ink composition was examined by varying the pigment to polymer weight ratio in the polymer-encapsulated pigment used in the ink composition described in Example 1. Nine ink compositions were prepared by using nine kinds of polymer-encapsulated pigment 1 having a polymer content of 5 wt %, 10 wt %, 15 wt %, 20 wt %, 25 wt %, 30 wt %, 40 wt %, 50 wt %, and 60 wt % based on the total pigment (polymer-encapsulated pigment 1 plus surface treated pigment 1). After the ink compositions were stored at 70° C. for 7 days, the viscosity was measured to calculate a viscosity increase due to the storage. The results obtained are shown in Table 1.

TABLE 1

| Polymer Content (%) | 5 | 10 | 15 | 20 | 25 | 30 | 40 | 50 | 60 |
|---|---|---|---|---|---|---|---|---|---|
| Viscosity Increase (%) | 30 | 15 | 10 | 0 | 0 | 0 | 0 | 0 | 0 |

It is seen from the results in Table 1 that the ink composition of the present invention exhibits storage stability when using a polymer-encapsulated pigment having a polymer content of 20% by weight or more. The same examination of viscosity increase was given to the ink compositions prepared in Examples 2 to 8 to show the same results.

(2) Abrasion Resistance

The influence of the total pigment content (pigment content C1 in polymer-encapsulated pigment 1 plus pigment content C2 in surface treated pigment 1) and of the polymer content in polymer-encapsulated pigment 1 in the ink composition described in Example 1 on abrasion resistance was examined.

Concretely, eight kinds of polymer-encapsulated pigment 1 having a pigment content (C1) of 3.5 wt %, 2.63 wt %, 2.23 wt %, 1.75 wt %, 1.23 wt %, 0.88 wt %, 0.7 wt %, and 0.53 wt % based on the total weight of polymer-encapsulated pigment 1. Nine kinds of surface treated pigment 1 having a pigment content (C2) of 3.5 wt %, 4.37 wt %, 4.77 wt %, 5.25 wt %, 5.77 wt %, 6.12 wt %, 6.3 wt %, 6.47 wt %, and 7.0 wt % based on the total weight of surface treated pigment 1. Nine ink compositions were prepared by combining the polymer-encapsulated pigment and the surface treated pigment to have a total pigment content (C1 plus C2) of 7 wt %. Photo Print Paper available from Seiko Epson Corp. was printed solid on an inkjet printer PM-900C supplied by Seiko Epson Corp. using each of the nine ink compositions. The printed image was tested for abrasion resistance in accordance with JIS K5701 in which Sutherland Rub Tester (supplied by Toyo Seiki Kogyo Co., Ltd.) and wood-free paper are used. The abrasion resistance was evaluated based on the following criteria. A: No ink separation occurs (excellent); B: Slight ink separation occurs to a degree acceptable for practical use (fairly good); C: Ink separation occurs to a degree unacceptably for practical use (bad); D: Considerable ink separation occurs to a degree totally unacceptable for practical use (very bad). The results are shown in Table 2 below.

TABLE 2

| C1 (%) | 3.5 | 2.63 | 2.23 | 1.75 | 1.23 | 0.88 | 0.7 | 0.53 | 0 |
|---|---|---|---|---|---|---|---|---|---|
| C2 (%) | 3.5 | 4.37 | 4.77 | 5.25 | 5.77 | 6.12 | 6.3 | 6.47 | 7.0 |
| Total Pigment Content (%) | 7 | 7 | 7 | 7 | 7 | 7 | 7 | 7 | 7 |
| Polymer Content (%) | 20 | 15 | 13 | 10 | 7 | 5 | 4 | 3 | 0 |
| Judgement | A | A | A | B | B | B | C | C | D |

As is apparent from the results in Table 2, improvement in abrasion resistance is obtained where the polymer content of the polymer-encapsulated pigment is 5% by weight or greater with respect to the total pigment content of the polymer-encapsulated pigment and the surface treated pigment.

The same abrasion resistance tests carried on the ink compositions prepared in Examples 2 to 8 revealed the same results.

(3) Blurring

Various plain papers were printed with letters on an inkjet printer PM-900C available from Seiko Epson Corp. by using the ink compositions prepared in Examples 1 to 8 and Comparative Examples 1 to 3. Blurring of the printed materials was observed with the naked eye and rated on an A-to-D scale; A: No blurring; B: Slight and acceptable; C: Noticeable; D: Considerable and low acceptable for practical use.

The plain papers used were Conqueror (from Arjowiggins), Favorit (from Freiweiss), Modo Copy (from Freiweiss), Rapid Copy (Igepa), Epson EPP (from Seiko Epson), Xerox P (from Fuji Xerox), Xerox 4024 (from Fuji Xerox), Xerox 10 (from Fuji Xerox), Neenha Bond (from Kimberly-Clerk), Ricopy 6200 (from Ricoh), Yamayuri (from Oji Paper), and Xerox R (from Fuji Xerox).

The results obtained are shown in Table 3.

TABLE 3

| | Example | | | | | | | | Comp. Example | | |
|---|---|---|---|---|---|---|---|---|---|---|---|
| | 1 | 2 | 3 | 4 | 5 | 6 | 7 | 8 | 1 | 2 | 3 |
| Conqueror | A | A | A | A | A | A | A | A | C | C | C |
| Favorit | A | A | A | A | A | A | A | A | D | D | D |
| Modo Copy | A | A | A | A | A | A | A | A | C | D | D |
| Rapid Copy | A | A | A | A | A | A | A | A | D | D | D |
| Epson EPP | A | A | A | A | A | A | A | A | C | C | C |
| Xerox P | A | A | A | A | A | A | A | A | C | C | D |
| Xerox 4024 | A | A | A | A | A | A | A | A | D | D | D |
| Xerox 10 | A | A | A | A | A | A | A | A | C | D | D |
| Neenha Bond | A | A | A | A | A | A | A | A | C | D | D |
| Ricopy 6200 | A | A | A | A | A | A | A | A | D | C | D |
| Yamayuri | A | A | A | A | A | A | A | A | D | D | D |
| Xerox R | A | A | A | A | A | A | A | A | D | D | D |

As is apparent from the results in Table 3, all the materials printed in the ink compositions of Comparative Examples suffered blurring, while those printed in the ink compositions prepared in Examples 1 to 8 were satisfactory in blurring resistance.

(4) Storage Stability

The ink compositions prepared in Examples 1 to 8 and Comparative Example 1 were each sealed into a glass bottle and allowed to stand at 60° C. for one week. After the 1-week standing, the ink compositions were inspected for any foreign matter generated, and the viscosity of the ink compositions was measured and compared with that before the standing.

Generation of foreign matter was evaluated based on the following criteria. A: No foreign matter; B: Slight foreign matter generated to a degree acceptable for practical use; C: Foreign matter generated to a degree unacceptable for practical use; D: Very much foreign matter generated. The viscosity change was also evaluated based on the following criteria. A: No increase; B: Increase of 5% or less; C: Increase of more than 5% and not more than 10%; D: Increase of more than 10%. The results obtained are shown in Table 4.

TABLE 4

| | Example | | | | | | | | Comp. Example 1 |
|---|---|---|---|---|---|---|---|---|---|
| | 1 | 2 | 3 | 4 | 5 | 6 | 7 | 8 | |
| Foreign Matter | A | A | A | A | A | A | A | A | D |
| Viscosity | A | A | A | A | A | A | A | A | D |

It is seen from the results in Table 4 that all the ink compositions of the invention tested undergo substantially no foreign matter generation nor change in physical properties and exhibit satisfactory storage stability.

An ink composition having the same formulation as in Example 1 except for replacing the colorant with the pigment of Comparative Example 1 was tested similarly. After the standing, the change in surface tension was small, but the ink suffered foreign matter generation, which resulted in reduced filterability and thickening, leading to a failure to obtain ejection stability.

(5) Ejection Stability

The ink compositions prepared in Examples 1 to 8 and Comparative Example 1 were each used for continuous text printing on 100 sheets of A4 size plain paper (Xerox P from Fuji Xerox) on an inkjet printer PM-900C (from Seiko Epson), and their ejection stability was evaluated based on the following criteria. A: No image distortion; B: Image distortion in less than 10 points; C: Image distortion in 10 or more points; D: Even only one sheet cannot be printed completely. The results are shown in Table 5.

TABLE 5

| | Example | | | | | | | | Comp. Example 1 |
|---|---|---|---|---|---|---|---|---|---|
| | 1 | 2 | 3 | 4 | 5 | 6 | 7 | 8 | |
| Stability | A | A | A | A | A | A | A | A | D |

INDUSTRIAL APPLICABILITY

The ink composition of the present invention makes it possible to achieve sufficient color developability on printing plain paper with which it has been difficult to obtain sufficient color developability, exhibits satisfactory abrasion resistance when printed on exclusive papers, controls blurring on plain paper, and has excellent storage stability.

Containing a pigment as a colorant, the ink composition of the invention provides a printed material excellent in water resistance, gas resistance, and light fastness. It also has excellent ejection stability in an inkjet system.

Since the polymer which coats the colorant is allowed to have an arbitrary function by appropriately selecting the polymerizable monomer or other reactants, the ink composition of the invention can enjoy a diversity of functions such as light fastness, gas resistance, coloring properties, gloss, and fixing properties.

While the invention has been described with reference to the specific embodiments thereof, various changes and modifications obvious to one skilled in the art are included under the scope thereof.

The invention claimed is:

1. A water-based pigment ink composition comprising, as colorants,
   (1) a surface treated pigment having a water-dispersibility imparting group introduced to the surface thereof, and
   (2) a water-dispersible polymer-encapsulated pigment which is a pigment wholly coated with a polymer by emulsion polymerization with a polymerizable surface active agent and a copolymerizable monomer, said composition further comprising an acetylene glycol surface active agent and a 1,2-alkylene glycol.

2. The water-based pigment ink composition according to claim 1, wherein one or more raw material pigments of said surface treated pigment (1) and one or more raw material pigments of said water-dispersible polymer-encapsulated pigment (2) are the same or different.

3. The water-based pigment ink composition according to claim 1, wherein the raw material pigment of said surface treated pigment (1) or the raw material pigment of said water-dispersible polymer-encapsulated pigment (2) is an inorganic pigment or an organic pigment.

4. The water-based pigment ink composition according to claim 3, wherein said inorganic pigment is carbon black.

5. The water-based pigment ink composition according to claim 3, wherein said organic pigment is an anthraquinone pigment, a phthalocyanine pigment, an azo pigment, a pyranthrone pigment, a perylene pigment, a perinone pigment, a quinacridone pigment, an indigoid pigment, a thioindigoid pigment, a dioxazine pigment, an isoindolinone pigment or a quinophthalone pigment.

6. The water-based pigment ink composition according to claim 1, wherein said water dispersibility imparting group of said surface treated pigment (1) is a carboxylic acid group ora salt thereof, a sulfonic acid group or a salt thereof, or a quaternary ammonium salt group.

7. The water-based pigment ink composition according to claim 1, which comprises 0.1 to 10% by weight of said surface treated pigment (1) and 0.1 to 10% by weight of said water-dispersible polymer-encapsulated pigment (2).

8. The water-based pigment ink composition according to claim 1, wherein the polymer content of said water-dispersible polymer-encapsulated pigment (2) is 10% by weight or more based on the weight of the pigment of said water-dispersible polymer-encapsulated pigment (2).

9. The water-based pigment ink composition according to claim 1, wherein the total amount of the pigment in said surface treated pigment (1) and the pigment in said water-dispersible polymer-encapsulated pigment (2) is 0.1 to 20% by weight based on the weight of the total ink composition.

10. The water-based pigment ink composition according to claim 1, wherein the polymer content of said water-dispersible polymer-encapsulated pigment (2) is 5 to 50% by weight based on the total weight of the pigment of said water-dispersible polymer-encapsulated pigment (2) and the pigment of said surface treated pigment (1).

11. The water-based pigment ink composition according to claim 1, which further comprises an acetylene alcohol surface active agent or a compound selected from the group consisting of diethylene glycol monobutyl ether, triethylene glycol monobutyl ether, propylene glycol monobutyl ether, dipropylene glycol monobutyl ether, and a compound represented by general formula (1):

$$R\text{-}(EO)_n\text{---}(PO)_m\text{-}M \qquad (1)$$

wherein R represents a straight-chain or branched alkanol group having 4 to 12 carbon atoms, a cycloalkanol group having 4 to 12 carbon atoms, a phenol group or a naphthol group; EO stands for an ethyleneoxy group; PG stands for a propyleneoxy group; n and m each independently represent 0 to 10 provided that they do not simultaneously represent 0, n and m each indicate an average number of the repeating units EO and PO, respectively, present in the whole molecule; the partial formula $R\text{-}(EO)_n\text{---}(PO)_m\text{-}M$ does not mean to limit the positions or the orders of EO and PO in the molecule but means to represent that EO and PO are present in the molecule at arbitrary positions in arbitrary orders; M represents a hydrogen atom, a sulfonic acid salt group, a phosphoric acid salt group or a boric acid salt group; and, where M is a sulfonic acid salt group, a phosphoric acid salt group or a boric acid salt group, it may have, as a counter ion, a hydrogen ion, an alkali metal ion, an inorganic base ion or an organic amine ion.

12. The water-based pigment ink composition according to claim 11, which contains 5% by weight or less of said acetylene glycol surface active agent and said acetylene alcohol surface active agent.

13. The water-based pigment ink composition according to claim 11, wherein said 1,2-alkylene glycol is a 1,2-alkylene glycol having 4 to 10 carbon atoms and is present in an amount of 10% by weight or less.

14. The water-based pigment ink composition according to claim 13, which contains 1,2-pentanediol and/or 1,2-hexanediol as said 1,2-alkylene glycol.

15. The water-based pigment ink composition according to claim 11, which contains propylene glycol monobutyl ether or dipropylene glycol monobutyl ether in an amount of 10% by weight or less.

16. The water-based pigment ink composition according to claim 11, which contains diethylene glycol monobutyl ether or triethylene glycol monobutyl ether in an amount of 20% by weight or less.

17. The water-based pigment ink composition according to claim 11, which contains the compound of formula (1), wherein M of formula (1) represents a hydrogen atom, a sulfonic acid salt group, a phosphoric acid salt group or a boric acid salt group, and said sulfonic acid salt group, said phosphoric acid salt group or said boric acid salt group have, as a counter ion, a hydrogen ion, an alkali metal ion, an inorganic base ion or an orgarnc amine ion.

18. The water-based pigment ink composition according to claim 11, which contains the compound of formula (1), wherein, in formula (1), n is 0 to 10, and m is 1 to 5.

19. A method for ink jet recording comprising (a) providing the water-based pigment ink composition according to claim 1, and (b) ejecting the composition from an ink jet recording head onto the surface of a recording medium to form a print thereon.

* * * * *